(12) United States Patent
Kappers et al.

(10) Patent No.: US 11,727,230 B2
(45) Date of Patent: *Aug. 15, 2023

(54) REFUSE VEHICLE QR CODE SYSTEMS AND METHODS

(71) Applicant: Oshkosh Corporation, Oshkosh, WI (US)

(72) Inventors: Jerrod Kappers, Oshkosh, WI (US); Jeff Koga, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,378

(22) Filed: Jan. 28, 2022

(65) Prior Publication Data
US 2022/0156474 A1 May 19, 2022

Related U.S. Application Data

(63) Continuation of application No. 17/232,227, filed on Apr. 16, 2021, now Pat. No. 11,295,102.

(60) Provisional application No. 63/011,323, filed on Apr. 17, 2020.

(51) Int. Cl.
| | | |
|---|---|---|
| *G06K 7/10* | (2006.01) |
| *G06K 7/14* | (2006.01) |
| *G06K 19/06* | (2006.01) |
| *G07C 5/08* | (2006.01) |
| *G06K 19/07* | (2006.01) |
| *G06F 16/23* | (2019.01) |
| *G06K 19/077* | (2006.01) |

(52) U.S. Cl.
CPC ..... *G06K 7/10861* (2013.01); *G06F 16/2365* (2019.01); *G06K 7/1417* (2013.01); *G06K 19/06028* (2013.01); *G06K 19/0723* (2013.01); *G06K 19/0776* (2013.01); *G07C 5/0808* (2013.01)

(58) Field of Classification Search
CPC ............. G06K 7/10861; G06K 7/1417; G06K 19/06028; G06F 16/2365
USPC ....................................................... 235/119
See application file for complete search history.

(56) References Cited

U.S. PATENT DOCUMENTS

| | | | |
|---|---|---|---|
| 5,837,945 A | 11/1998 | Cornwell et al. |
| 10,997,802 B2 | 5/2021 | Koga et al. |
| 11,001,135 B2 | 5/2021 | Yakes et al. |
| 11,007,863 B2 | 5/2021 | Yakes et al. |
| 2003/0101069 A1 | 5/2003 | Sando |
| 2008/0106415 A1 | 5/2008 | Sellew et al. |
| 2010/0246312 A1 | 9/2010 | Welker et al. |

(Continued)

*Primary Examiner* — Allyson N Trail
(74) *Attorney, Agent, or Firm* — Foley & Lardner LLP

(57) ABSTRACT

A vehicle system includes a vocational vehicle, a tag, and a data management controller. The vocational vehicle includes a chassis and a body. The chassis includes a first subcomponent. The body includes a second sub component supported by the chassis. The body defines a receptacle. The tag is attached to at least one of the first subcomponent and the second subcomponent. The tag includes an identifier that encodes tag data. The data management controller is configured to receive tag data associated with the tag. The data management controller is configured to provide material from a tag database stored by the data management controller to a user device based on the tag data. The material is associated with the at least one of the first subcomponent and the second subcomponent.

19 Claims, 6 Drawing Sheets

(56) References Cited

U.S. PATENT DOCUMENTS

| | | |
|---|---|---|
| 2011/0316689 A1 | 12/2011 | Reyes et al. |
| 2013/0006775 A1 | 1/2013 | Jordan et al. |
| 2016/0082925 A1 | 3/2016 | Arocha et al. |
| 2016/0148440 A1 | 5/2016 | Kwak |
| 2019/0042816 A1 | 2/2019 | McQuade et al. |
| 2019/0354827 A1 | 11/2019 | Prabhakar |
| 2020/0265656 A1 | 8/2020 | Koga et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0348681 A1 | 11/2020 | Clifton et al. |
| 2021/0110122 A1 | 4/2021 | Volkerink |

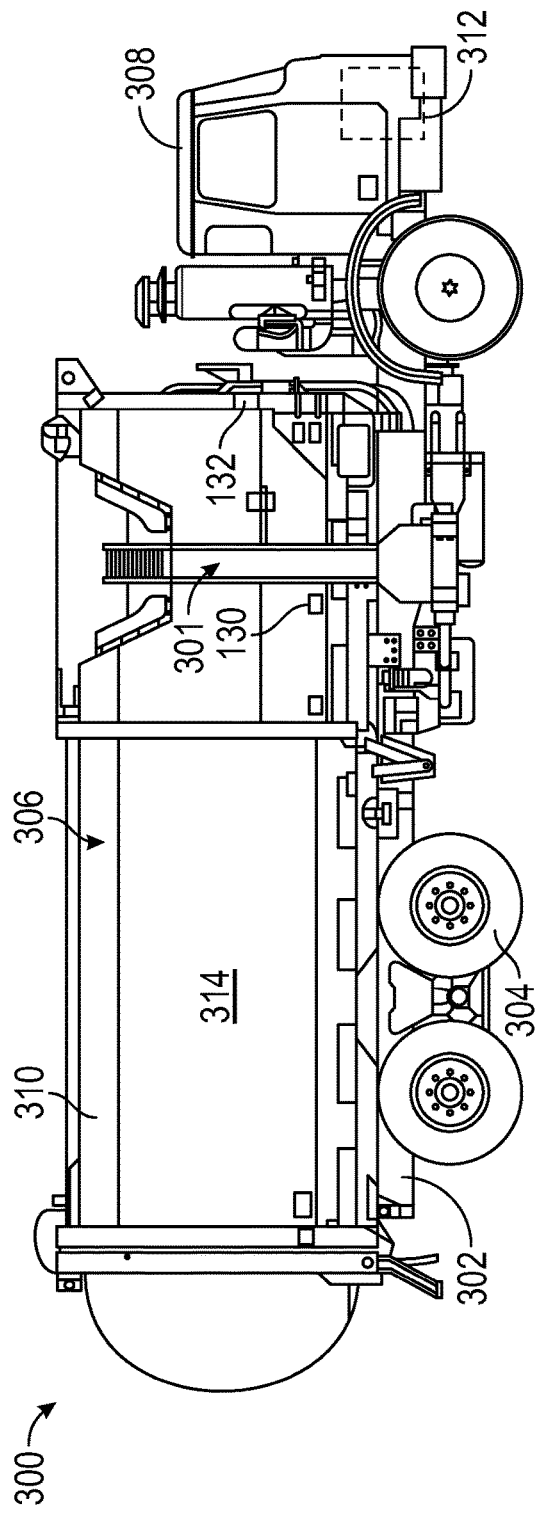

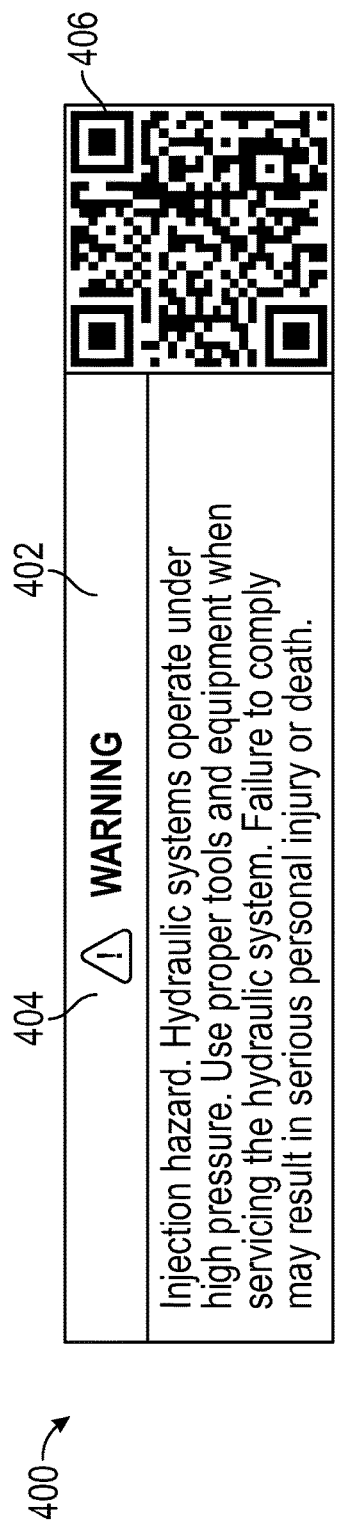

| ⚠ WARNING |
|---|
| Injection hazard. Hydraulic systems operate under high pressure. Use proper tools and equipment when servicing the hydraulic system. Failure to comply may result in serious personal injury or death. |

FIG. 4

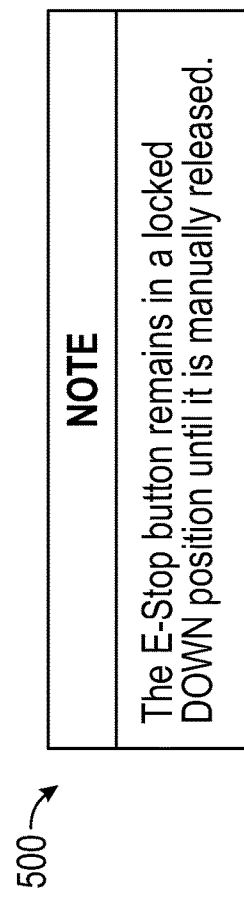

| NOTE |
|---|
| The E-Stop button remains in a locked DOWN position until it is manually released. |

FIG. 5

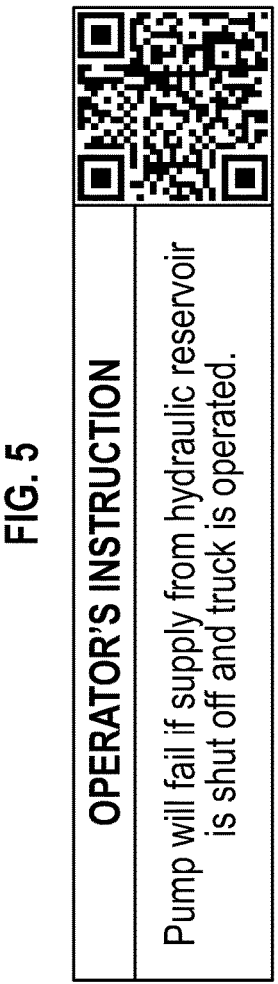

| OPERATOR'S INSTRUCTION |
|---|
| Pump will fail if supply from hydraulic reservoir is shut off and truck is operated. |

FIG. 6

REFUSE VEHICLE QR CODE SYSTEMS AND METHODS

CROSS-REFERENCE TO RELATED PATENT APPLICATIONS

This is a continuation of U.S. application Ser. No. 17/232,227, filed Apr. 16, 2021, which claims the benefit of and priority to U.S. Provisional Application No. 63/011,323, filed Apr. 17, 2020, both of which are incorporated herein by reference in their entireties.

BACKGROUND

The present disclosure relates generally to user safety and instructional information for equipment. More specifically, the present disclosure relates to tags for equipment that include safety and instructional information.

SUMMARY

One exemplary embodiment relates to a vehicle system including a vocational vehicle, a tag, and a data management controller. The vocational vehicle includes a chassis and a body. The chassis includes a first subcomponent. The body includes a second sub component supported by the chassis. The body defines a receptacle. The tag is attached to at least one of the first subcomponent and the second subcomponent. The tag includes an identifier that encodes tag data. The data management controller is configured to receive tag data associated with the tag. The data management controller is configured to provide material from a tag database stored by the data management controller to a user device based on the tag data. The material is associated with the at least one of the first subcomponent and the second subcomponent.

Another exemplary embodiment relates to a method including receiving, by a data management controller, tag data from a tag attached to at least one of a first subcomponent and a second subcomponent of a vocational vehicle. The method includes providing, by the data management controller, material from a tag database stored by the data management controller to a user device based on the tag data. The material is associated with the at least one of the first subcomponent and the second subcomponent.

Another exemplary embodiment relates to a non-transitory computer readable medium having computer-executable instructions embodied therein that, when executed, cause the data management controller to perform operations. The operations include receiving tag data from a tag attached to at least one of a first subcomponent and a second subcomponent of a vocational vehicle. The operations include providing material from a tag database stored by the data management controller to a user device based on the tag data. The material is associated with the at least one of the first subcomponent and the second subcomponent.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which:

FIG. 3A is a side view of a refuse vehicle that includes tags, according to an exemplary embodiment;

FIG. 3B is a side perspective view of a mixer vehicle that includes tags, according to an exemplary embodiment;

FIGS. 4-6 are tags for equipment that include a QR code, according to various exemplary embodiments;

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Manufacturers and operators of equipment (e.g., vehicles, components of vehicles, tools, machinery, etc.) can employ the embodiments of the system disclosed herein to disperse or obtain material (e.g., instructional material, safety material, etc.) regarding such equipment to improve the safety and performance of the equipment operators. The information can include, but is not limited to, how to safely control, operate, install, repair, and maintain the equipment. For example, a vocational vehicle (e.g., refuse vehicle, mixer vehicle, etc.) can have an tag associated with a specific component (or subcomponent) of the vehicle. The tag can be coupled to the vehicle near or on the associated equipment and can be embedded with computer-readable instructions (e.g., quick response (QR) code, radio-frequency identification (RFID) tag, bar code, etc.). When those instructions are read by a device, the tags can provide the associated material to the operator of the device to help the operator perform an intended task. For example, if the operator needs to replace fluid lines of a hydraulic system of a refuse vehicle, the tag associated with the hydraulic system can automatically direct the operator, via the device, to material (e.g., diagrams, manuals, videos, instructions, etc.) related to the hydraulic system to aid the operator in replacing the fluid lines. One embodiment of the system is configured to monitor and collect data on what information is accessed, how often it is accessed, and who accesses it to determine product performance and material effectiveness. The system can also solicit feedback from those who use the system. This data can be provided to third parties (e.g., suppliers, manufacturers, dealers, etc.) to improve both the equipment and the material available via the tags. Among other benefits, the system simplifies operation of equipment and improves operator performance and safety.

Figure 1:
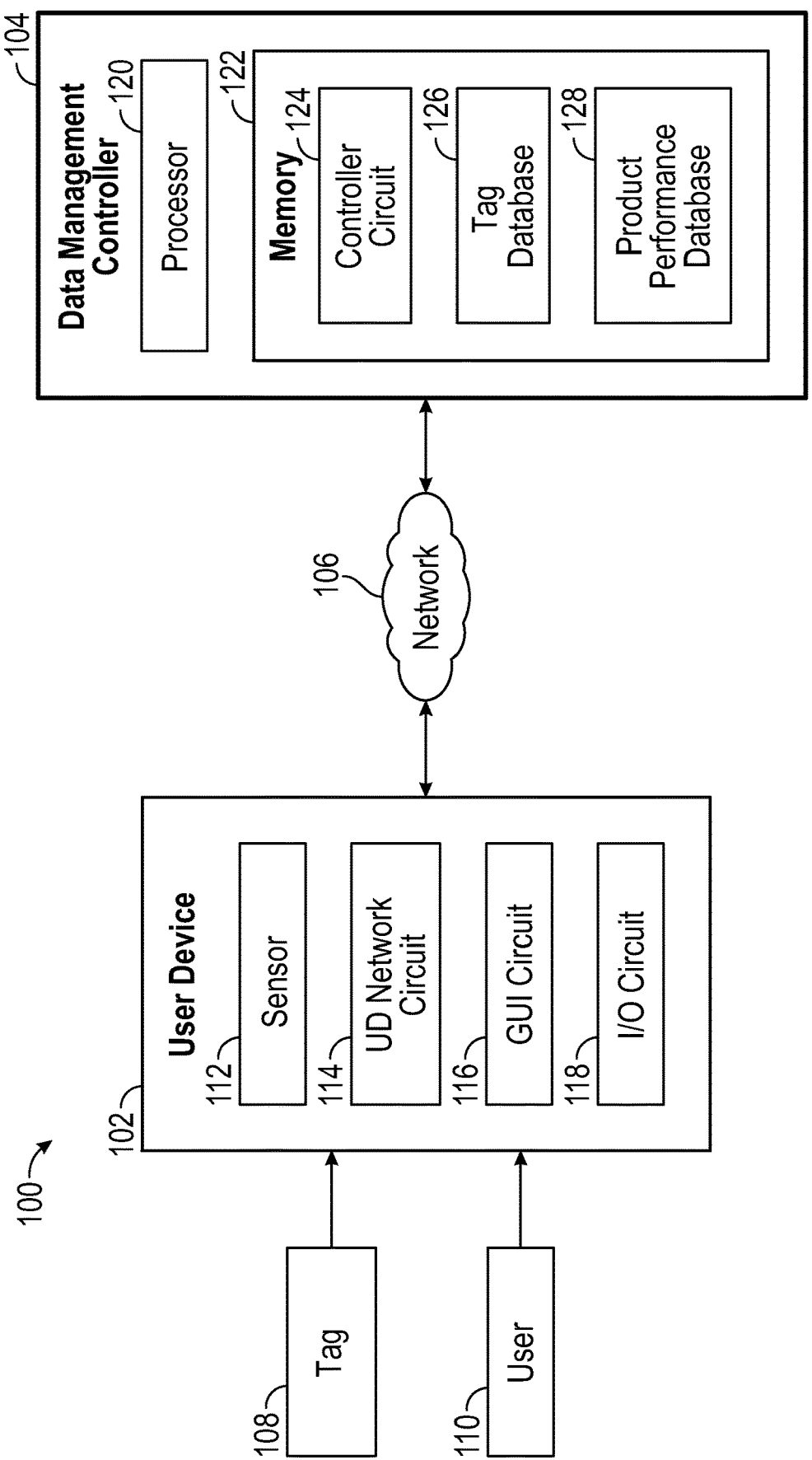
FIG. 1 is a block diagram of a tag-based information system for equipment, according to an exemplary embodiment.

According to an exemplary embodiment, as shown in FIG. 1, an instructional system 100 is configured to receive tag data from a tag located on equipment and to present material (e.g., videos, manuals, operator checks, telematics data, augmented reality, e-commerce data, etc.,) to an operator or another user based on the tag data. For example, the tag data of a tag corresponds to a subcomponent of a refuse vehicle to which the tag is attached such that, in response to a sensor interfacing with an identifier of the tag, a user device is provided with material that is specific to the subcomponent to which the tag is attached. Instructional system 100 includes a user device 102 and a data management controller 104 (e.g., system, control circuit, control module, etc.). The user device 102 is communicably coupled with the data management controller 104 via network 106. The network 106 includes any form of wired and/or wireless communications exchange including, for example, a wireless gateway, the interne, or another short range or long range communications format. In other embodiments, the instructional system 100 includes additional, fewer, and/or different components.

The user device 102 of instructional system 100 can be any form of personal computing device such as a cell phone, a tablet, a laptop, or another type of portable computing device. As shown in FIG. 1, the user device 102 is configured to receive and interpret tag data from at least one tag 108 located on equipment and/or from a user 110. The tag 108 is a physical tag or a descriptive label that is applied (e.g., affixed, coupled, connected, adhered, etc.) to any type of equipment including, but not limited to, vehicles, machines, tools, components, etc. The tag 108 may be applied to any type of vehicle, including on-road and off-road vehicles. The tag 108 may be applied to a commercial truck (e.g., a commercial long haul truck with a cargo carrier, a semi-truck, etc.), off-road construction equipment (e.g., a skid steer loader, a front-end loader, a wheel loader, etc.), an off-road vehicle that includes a cargo body (e.g., vehicles used to transport fill and rocks for mining or construction, etc.), a lift (e.g., a telehandler, a forklift, a boom lift, etc.), or another vehicle type. According to an exemplary embodiment, as shown in FIG. 3A, the vehicle is a refuse vehicle 300 that is used to transport material from various waste receptacles within a municipality to a storage and/or processing facility (e.g., a landfill, an incineration facility, a recycling facility, etc.). The tag 108 may also be applied to any type of equipment or component associated with those vehicles, or any other machinery that may require additional instruction to install, operate, fix, replace, etc. For example, a motor, whether or not a part of a larger system (e.g., a vehicle or a lawnmower) may have a tag 108 attached to it.

The user device 102 of instructional system 100 includes a sensor 112, a user device network circuit 114, a graphical user interface (GUI) circuit 116, and an input/output (I/O) circuit 118. The user device 102 is configured to receive and interpret tag data from a tag 108 located on equipment (e.g., vehicles, machinery, tools, components, etc.). The sensor 112 is configured to detect a tag 108 located on equipment and read the tag 108. For example, detection includes seeing, or imaging, the tag (e.g., seeing the tag through a lens or scanner, image recognition, etc.), or sensing the tag due to proximity (e.g., being close enough to sense the electromagnetic fields of a radio frequency identification (RFID) tag). Reading the tag 108 may include any method of deciphering what the tag 108 corresponds to. For example, a tag 108 on the side of a truck located near a hydraulic system corresponds to material about how to operate the hydraulic system, including videos, how-to guides, manuals, etc. Instructional system 100 determines that specific tag 108 corresponds to those specific materials by the sensor 112 of the user device 102 detecting the tag 108 by imaging or sensing the tag 108 and deciphering what the tag 108 says. The information deciphered (e.g., tag data) is then be transmitted to the data management controller 104 via the user device network circuit 114.

According to an exemplary embodiment, the user device network circuit 114 is configured to facilitate data transmission between the user device 102 and other systems capable of transmitting data (e.g., devices, entities, etc.). For example, the user device network circuit 114 transmits data between the user device 102 and the data management controller 104 via the network 106. The user device network circuit 114 may also transmit data between the user device 102 and a third-party computing system (not shown) via the network 106. In one embodiment, an input from a tag 108 is transmitted to the user device 102 via the user device network circuit 114. Data that the user device network circuit 114 receives, is displayed on the user device 102 to the user 110 via the GUI circuit 116. The GUI circuit 116 is configured to present, control, or otherwise manage displays on the user device 102. The I/O circuit 118 facilitates data transfer between the user device 102 and the user 110. The I/O circuit 118 enables the user 110 to respond to what is displayed by the user device 102 or prompt the user device 102 to display something by providing inputs, and the I/O circuit enables the user 110 to respond to those inputs and provide outputs to the user 110.

Figure 2:
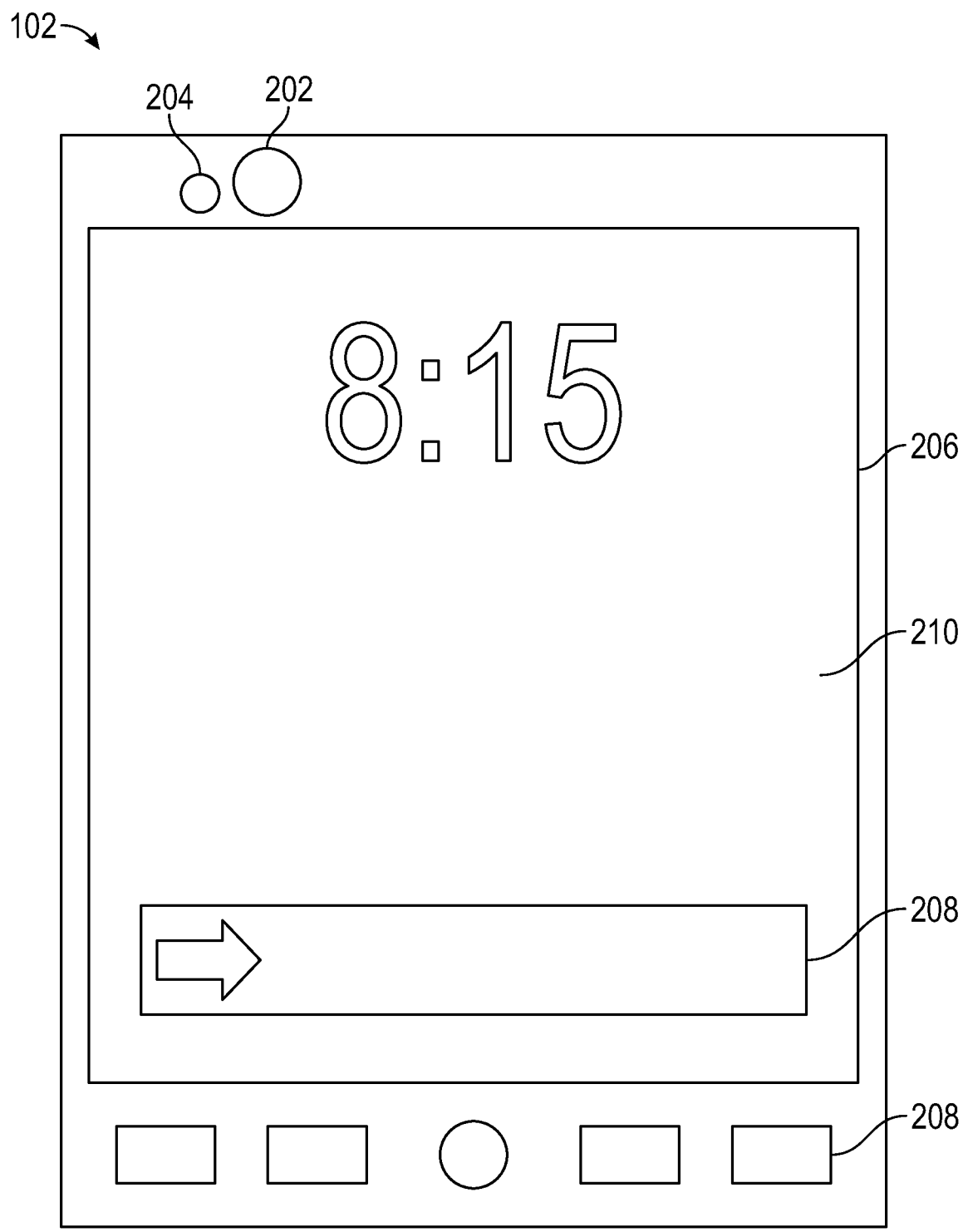
FIG. 2 is a front view of a user device, according to an exemplary embodiment.

According to an exemplary embodiment, as shown in FIG. 2, the sensor 112 of user device 102 includes a camera 202 and an illuminator 204. The illuminator 204 may be any form of light source such as a light emitting diode. To detect and read a tag 108, the illuminator 204 is positioned on the user device 102 to illuminate an area in the vicinity of the user device 102, such as to allow the camera 202 to detect and read a tag 108. For example, the illuminator 204 emits light onto a QR code so the camera 202 can detect and read it. The sensor 112, in this example, is configured to detect the amount of reflected light from surfaces that are positioned in front of the illuminator 204 (e.g., the tag 108). In other embodiments, the sensor 112 is another type of ambient light sensor, or a sensor that senses other environmental factors (e.g., electromagnetic fields).

In some embodiments, the sensor 112 of the user device 102 is configured to generate an analog signal in response to the intensity of the reflected light from the illuminator 204, or in response to sensing other environmental factors. In other embodiments, the user device 102 includes an analog-to-digital converter to convert the analog signal generated by the sensor 112 to a digital signal. In further embodiments, the user device 102 also includes a decoder to interpret the digital signal. For example, the user device includes a decoder to decipher tag data that is associated with an identifier of the tag 108 (e.g., the tag data associated with the QR code on the tag 108). In other embodiments, the user device 102 includes another type of code detection/identification and decoding device.

According to an exemplary embodiment, user device 102, as shown in FIG. 2, includes a user interface 206 and at least one interactive point 208. The GUI circuit 116 of the user device 102 configures the user interface 206 to display outputs and receive inputs. For example, the user interface 206 is configured to receive commands from a user 110 such as an operator of the equipment (e.g., a vehicle operator or technician). The user interface 206 may include one or more controls, displays, speakers, lights, or other computer user interfaces for conveying and receiving information. According to another exemplary embodiment, the user interface 206 includes a touch-screen display 210 (e.g., a liquid crystal display (LCD), etc.) for presenting the material to the user 110 and receiving user inputs. In other embodiments, the user interface can include other types of displays. The user device 102 includes at least one interactive point 208. In one embodiment, the interactive point 208 is integrated into the touch-screen display 210. In other embodiments, the interactive point 208 is a physical switch, toggle, dial, or other form of actuator to receive user inputs. The user device 102 may further include a communications interface (e.g., a transceiver), a memory, and/or a processor to facilitate device operations, for example, similar to the data management controller 104, as will be described in more detail below.

According to an exemplary embodiment, as shown in FIG. 1, the data management controller 104 is communicably coupled with the user device 102 via network 106 and is configured to exchange data with the user device 102. The data management controller 104 may also communicably coupled with other third-party computer systems (not shown). In particular, the data management controller 104 is configured to receive the tag data of the tag 108 from the user device 102 and to provide material to the user device 102 based on the tag data. The tag data identifies material associated with the tag 108. According to an exemplary embodiment, the data management controller 104 is a server that is hosted by a supplier and/or manufacturer of the equipment with the tag 108 (e.g., the refuse vehicle 300 of FIG. 3A, the mixer vehicle 350 of FIG. 3B). In other embodiments, the data management controller 104 is a vehicle controller (e.g., a controller associated with the vehicle including material associated with any or all sub-components of the vehicle), or another type of third-party hosted portal. The material provided to the user device 102 can come directly from the data management controller 104, or the data management controller can redirect the user 110 of the user device 102 to a web service link (e.g., a website) that includes the material associated with the tag data.

According to an exemplary embodiment, the data management controller 104 of the instructional system 100 includes a processor 120 and a memory 122. The processor 120 is configured to process, analyze, or otherwise manage data transmitted to the data management controller. For example, if data from a tag 108 is received from the user device 102 via the network 106, the processor 120 determines which material in the memory 122 matches the tag 108. The processor also provides the material matching the tag 108 to the user 110 of the user device 102 via the network 106. The memory 122 is configured to store information regarding equipment and the corresponding tags 108. The memory 122 includes a controller circuit 124, a tag database 126, and a product performance database 128. The tag database 126 stores and manages materials (e.g., videos, user manuals, repair instructions, operator checks, telematics data, e-commerce information, etc.) corresponding to respective tags 108. In other embodiments, the tag database 126 stores information regarding where to find the material and/or how to access the material (e.g., links to websites, etc.), if the material is not stored directly by the tag database 126. The tags 108 may be of different types, may include different text/images, and may be in different locations along the equipment. In some embodiments, the material is subdivided into different applications, where each application is associated with a particular type of tag.

According to an exemplary embodiment, the material includes videos that provide additional information to a user 110 regarding the operation of one or more vehicle components or subsystems (e.g., safety videos that inform the user of unsafe practices that may result in injury or death). Additionally, the material may also include training information relating to component functionality (e.g., how to operate different vehicle components), best practices, and helpful tips. The material may also provide information regarding vehicle setup before use, or in preparation for maintenance. The material may also provide step-by-step instructions for how to install and remove components such as tooling for the hydraulic system of refuse vehicle 300, and other components. The material may also provide step-by-step instructions for testing the various vehicle components such as the hydraulic system for example, during maintenance events. The material may also provide helpful tips such as information relating to the position and operation of emergency-stop switches, oil level and temperature check positions/recommendations, and other vehicle operating information. The material may be organized within the tag database 126 based on the tag data (e.g., different web addresses/URLs for different material, etc.) or as part of a library that also contains material for other types of tags 108. For example, refuse vehicle 300 may have a tag 108 for the hydraulic system and another tag 108 for a lift. Each tag 108 may have unique tag data. The material associated with the tag data may be organized within the tag database 126 so that when the lift tag is detected and read, all the material associated with the lift may be easily accessed.

The tag database 126 of the memory 122 also includes requests based on user inputs. In an example embodiment, the user device 102 detects and reads a tag 108 and the user 110 receives, via the user device 102, the associated material. If the material provided is not helpful, is out-of-date (i.e., stale), or is wrong, or the user 110 was looking for information that was not included in the material, the user 110 can submit a request to have the targeted material added, updated, or removed from the tag database 126. The tag database 126 is updated and stores the request. Responsive to the tag database updating to include the request, the data management controller 104 transmits a notice, by the processor 120, to an appropriate third-party computing system (e.g., the supplier or manufacturer of the equipment) requesting updated material in accordance with the request.

The product performance database 128 of the memory 122 includes data relating to the performance of equipment (e.g., how long vehicle components and/or subsystems may last before needing repair or replacement). According to an exemplary embodiment, the product performance database 128 includes product performance indicators (e.g., metrics, indices, etc.) to quantify how well a component of equipment is performing (e.g., operating, etc.). In one embodiment, the product performance indicators are counters that record the number of times a video or other instructional information is accessed for a particular tag type based on the tag data received from multiple users of certain equipment (e.g., for different vehicles and from different vehicle operators, a fleet of vehicles, etc.). In other embodiments, the indicator is a component-specific performance metric that may be obtained from the tag database.

In another exemplary embodiment, the product performance database 128 also includes product performance data that is determined based on user inputs. In an example embodiment, the material forms a part of an application, and providing the material includes providing the application to the user device 102. The application solicits, by the data management controller 104 via the processor 120, feedback from the user 110. The feedback is solicited, for example, through a pre-populated questionnaire that is stored in memory 122 (e.g., the product performance database 128), and that is distributed by the data management controller 104 to the user device 102 based, in part, on the tag data. The feedback is indicative of product performance. The feedback may include, for example, quality of the equipment, ease of repairing and/or replacing components, additional information that would be helpful to an operator or manufacturer, etc. Responsive to receipt of the feedback, the processor 120 updates the product performance database 128. Responsive to updating the product performance database 128, a notice is transmitted to an appropriate third-party computing system (e.g., supplier or manufacturer of the equipment associated with the tag 108) indicating the feedback received from the user 110. The notice includes the product performance indicator.

According to an exemplary embodiment, memory 122 includes a non-transitory computer-readable medium configured to store computer-readable instructions for the data management controller 104 that, when executed by the processor 120, causes the data management controller 104 to provide a variety of functionalities as described herein. For example, the memory 122 includes a controller circuit 124 configured to coordinate the exchange of information between the tag database 126, the product performance database 128, and the user device(s) 102, as will be described with reference to FIGS. 8-9.

According to an exemplary embodiment, the processor 120 is operatively coupled with each of the components of the data management controller 104, and is configured to control interaction between the components. For example, the processor 120 is configured to control the collection, processing, and transmission of tag data from a tag 108 located on equipment and user inputs from the user device 102. Additionally, the processor 120 is configured to interpret operating instructions from memory 122 (e.g., the controller circuit 124), to provide material to the user 110 based on the tag data.

The arrangement of the instructional system 100 described with reference to FIG. 1 should not be considered limiting. It will be appreciated that many alterations and combinations are possible without departing from the inventive concepts disclosed herein. For example, in some embodiments, the functionality provided by the data management controller 104 may be at least partially integrated into the user device 102. In particular, the functionality may be provided via an application installed on the user device 102 directly without interaction with the data management controller 104.

According to an exemplary embodiment, as shown in FIG. 3A, the refuse vehicle 300 includes a chassis 302 (e.g., frame, etc.) supporting a plurality of tractive elements, wheels 304, and a body 306. The chassis 302 includes at least one subcomponent. The body 306 also includes at least one subcomponent. For example, the body 306 includes a cabin 308 disposed toward a front end of the chassis 302 and a cargo body 310 disposed toward a rear end of the chassis 302 behind the cabin 308. The refuse vehicle 300 also includes a prime mover or engine 312 coupled with the chassis 302. The engine 312 may be configured to provide power to the wheels 304, and/or to other systems of the refuse vehicle 300 (e.g., a pneumatic system, a hydraulic system, etc.). The engine 312 may be configured to utilize one or more of a variety of fuels (e.g., gasoline, diesel, bio-diesel, ethanol, natural gas, etc.), or utilize energy from an external power source (e.g., overhead power lines, etc.) and to provide the power to the systems of the refuse vehicle 300. The refuse vehicle 300 also includes a transmission configured to transmit energy from the engine to the wheels 304. The refuse vehicle 300 may also include a suspension system, fuel storage system, steering system, brake system and/or other systems to facilitate transport operations for the refuse vehicle 300.

According to an exemplary embodiment, the refuse vehicle 300 includes various application-specific components (e.g., working components, subcomponents, etc.) configured to facilitate loading, storage, and unloading of refuse (e.g., garbage, trash, etc.). Among these are the cargo body 310, which defines a receptacle 314 (e.g., refuse container, etc.) that is configured to receive refuse and store refuse during transit operations. The refuse vehicle 300 also includes various application-specific components that are movable relative to the cargo body 310 and/or chassis 302, and are configured to facilitate working operations for the refuse vehicle 300 (e.g., refuse loading operations, refuse compaction operations, refuse unloading operations, etc.). For example, the refuse vehicle 300 may include a lift system 301 configured to selectively engage a waste container, the lift system 301 being movable to reposition the refuse container so as to discharge the contents of the refuse container into the receptacle 314. The lift system 301 may include lift arms used to eject waste/garbage from a temporary holding container into the receptacle 314, a hydraulic cylinder to actuate the lift arms, a compactor (e.g., packer, etc.) to compress the refuse within the receptacle 314, an ejector to discharge the refuse from the receptacle 314 (e.g., to unload the refuse), a repositionable tail gate door or receptacle access door, and/or other moving components. The application-specific components may also include components that are stationary relative to the chassis 302 such as motors and/or pumps used to power and/or control a hydraulic system for the refuse vehicle 300.

As shown in FIG. 3A, the refuse vehicle 300 includes tags 108 positioned in different areas along the chassis 302 and body 306. The tags 108 can be attached to the subcomponents of the chassis and the body 306. The tags 108 are often positioned in a highly visible area along the refuse vehicle 300, in line-of-sight of the operator such as on exterior panels of the body 306. The tags 108 may be safety tags that provide warning information to an operator and/or alert the operator to particularly hazardous areas around the refuse vehicle 300. In one embodiment, the tags 108 may warn the operator of areas where the lift arms, or other repositionable components (e.g., the application-specific components) seat against other parts of the body 306. For example, the tag 108 may be applied to the refuse vehicle 300 at a location that is vertically above the lift and/or grabber arm (e.g., tag 130) to alert an operator to stand clear of this area when the vehicle is running. Another tag (e.g., tag 132) may be positioned near at least one component of the hydraulic system (e.g., a hydraulic fluid manifold, fluid lines, hydraulic fluid tank, etc.) to notify the operator of the risk of injury due to leaking high pressure fluid. In another embodiment, the tags 108 may provide instructional information to the operator. For example, the tags 108 may remind the operator to use proper tools when servicing the hydraulic system and/or instruct the operator regarding how to activate/deactivate various application-specific components using levers, control buttons, and/or other vehicle controls. The tags 108 may also notify the operator about proper fluid levels, temperatures, and other operating conditions to reduce the risk of damage to the vehicle components or subsystems.

As shown in FIG. 3B, a mixer vehicle 350 (e.g., mixer truck, cement mixer, etc.) is configured as a concrete mixing and delivery vehicle. The mixer vehicle 350 is configured to transport a cement mixture (e.g., aggregate such as sand or gravel, water, and/or other adhesive compounds) from a quarry or cement production facility to various locations for distribution (e.g., a residence, a commercial property, a construction site, etc.). Similar to the refuse vehicle 300 of FIG. 3A, the mixer vehicle 350 of FIG. 3B includes a chassis 352 (e.g., frame, etc.) supporting a plurality of tractive elements, shown as wheels 354 and a body 356. As shown in FIG. 3B, the body 356 includes a cabin 358 disposed toward a front end of the chassis 352 and a mixing drum 360 disposed toward a rear end of the chassis 352 behind the cabin 358. The mixer vehicle 350 also includes a prime mover or engine coupled to the chassis 352, which may be the same or similar to the engine 312 described with reference to FIG. 3A.

According to an exemplary embodiment, the mixer vehicle 350 includes various application-specific components (e.g., working components, etc.) configured to facilitate loading, transportation, and delivery of cement. Among these are the mixing drum 360, which is moveable relative to the chassis (e.g., rotates relative to the chassis) to mix and/or agitate the cement stored therein and to thereby substantially prevent the cement from hardening while the mixer vehicle 350 is transporting the cement to the working site. The mixer vehicle 350 may also include various other application-specific components including, but not limited to, a hydraulic pump and/or motor to rotate the mixing drum 360, hydraulic actuators to reposition a delivery chute for the mixer vehicle 350, and hydraulic and/or pneumatic actuators to reposition a tag axle of the mixer vehicle 350. The mixer vehicle 350 of FIG. 3B includes tags 134 and 136 positioned in different areas along the chassis 352 and body 356. The tags 134 and 136 may be safety tags that provide warning information to an operator and/or alert the operator to particularly hazardous areas around the mixer vehicle 350. The tags 134 and 136 may be the same as or similar to the tags 108 described with reference to FIG. 3A. In other embodiments, the tags 108 may be different (e.g., specific to the mixer vehicle 350 and associated with operations that are exclusive to mixer vehicles 350). In the exemplary embodiment of FIG. 3B, the tag (e.g., tag 134) is applied to fluid storage tanks along the mixer vehicle 350 and provide information regarding the proper fluid levels. Additionally, the mixer vehicle 350 has at least one tag (e.g., tag 136) positioned near a component of the hydraulic system to warn the operator of hazardous conditions to watch out for (e.g., fluid leaks, etc.).

According to an exemplary embodiment, as shown in FIGS. 4-6, tags 108, shown as first tag 400, second tag 500, and third tag 600, for the equipment (e.g., refuse vehicle 300 of FIG. 3A, mixer vehicle 350 of FIG. 3B, among other equipment) are shown, according to various exemplary embodiments. As shown in FIG. 4, first tag 400 includes an operator facing side 402 and a backing (not shown) opposite the operator facing side 402. The first tag 400 may be a sticker-type label in which an adhesive layer (e.g., glue, etc.) is applied to the backing. In this way, the first tag 400 may be applied directly to a surface of the equipment. In other embodiments, the first tag 400 may be, for example, a thin plate that is riveted to a vehicle panel, may be etched into and/or printed on the equipment (e.g., on chassis 302 or body 306), or may be attached to the equipment by any other means (e.g., magnetically, hung by a hook or string, etc.).

As shown in FIG. 4, the operator facing side 402 includes information including a descriptive label containing text 404 and a machine-readable portion, shown as identifier 406. According to an exemplary embodiment, the identifier 406 is a QR code. In other embodiments, the identifier 406 is another machine-readable optical label such as a one dimensional barcode (e.g., UPC) or two dimensional matrix barcode (e.g., DataMatrix, Grid Matrix, etc.). In other embodiments, the code is be a machine sensible label such as an RFID tag, rather than machine-readable optical label. According to an exemplary embodiment, the identifier 406 includes tag data (e.g., tracker, etc.), which is used by the user device 102 and/or data management controller 104 to identify the tag 108 (e.g., the tag type, position, what component it is attached to, etc.) and to access the materials associated with the first tag 400, as will be further described. The tag data may be encoded in the identifier 406. For example, with respect to the QR code shown in FIG. 4, the tag data is decoded from the patterns that are present in both the horizontal and vertical components (e.g., patterns, blocks, etc.) of the image.

The arrangements and designs of the first tag 400, second tag 500 (FIG. 5) and third tag 600 (FIG. 6) are shown for illustrative purposes only. It will be appreciated that many alternatives and combinations are possible without departing from the inventive concepts disclosed herein. For example, the position of the identifier 406 relative to the text 404 may be different in various exemplary embodiments. Additionally, in some embodiments, the tag may only include the identifier 406 without the text 404. In other embodiments, the tags may include multiple identifiers 406 of the same and/or different type.

Figure 7:
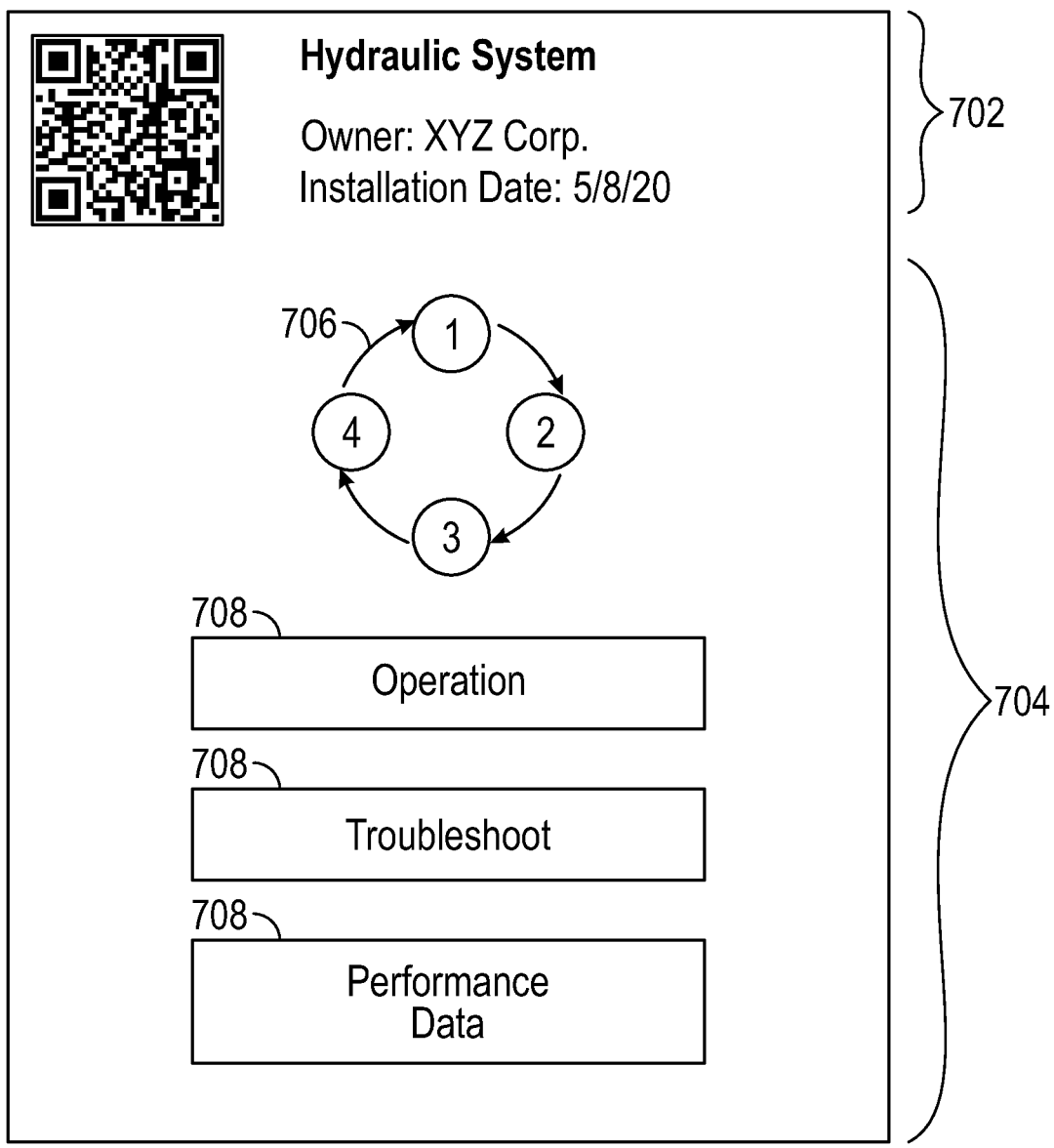
FIG. 7 is an example of a user interface, according to an exemplary embodiment.

According to an exemplary embodiment, as shown in FIG. 7, user interface 206 includes a display including data corresponding to a tag 108. Responsive to a user device 102 detecting an tag 108 and generating a signal, either the user device 102 or the data management controller 104 decodes the signal, and the data management controller 104 via the processor 120 matches the tag data from the tag 108 with the material in the memory 122 of the data management controller 104. For example, the tag 132 on the refuse vehicle 300 is be sensed by the sensor 112 of the user device 102. The tag data is transmitted over the network 106 via the user device network circuit 114 to the data management controller 104. The processor 120 decodes the tag data and determines that it corresponds to at least one component of the hydraulic system of refuse vehicle 300. For example, tag 132 may correspond to only one of the fluid lines, the hydraulic fluid manifold, and the hydraulic fluid tank, or tag 132 may correspond to any combination thereof. The data management controller 104 transmits data from the memory 122, via the processor 120, to the user device 102 to be displayed by the user interface 206. The data may include, for example, material, product performance data, and the like. The user interface 206 generated may be web-based (i.e. a website, etc.) or an application. According to an exemplary embodiment, the user interface 206 includes a header 702 and a content area 704. The header 702 contains any information related to identifying the equipment to which the sensed tag 108 corresponds. For example, the user interface 206 for tag 132 includes an image of the identifier of the tag 132 and a description of the corresponding equipment (e.g., Hydraulic System). Any information deciphered from tag 132 is included in the header 702 (e.g., owner of equipment, purchase date of equipment, installation date of equipment, etc.). The content area 704 includes substantive material 706, at least one interactive point 708, or a combination thereof. Substantive material 706 may include any information relating to the equipment the tag 108 corresponds to (e.g., a diagram showing how a system works, a list of steps to install the equipment, pictures of the components of the equipment, etc.). The interactive point 708 may be any element that can take input from the user 110 (e.g., a field for text, selectable buttons, etc.).

The content displayed in the content area 704 of the user interface 206 depend, in part, on what information is stored in the memory 122 of the data management controller 104. For example, if the only information stored in the memory 122 associated with tag 132 is a diagram of how the hydraulic system works (e.g., substantive material 706), then the user interface 206 may show only the diagram. Alternatively, if the memory 122 contains videos of installation, how-to manuals for using each component, performance data for each component, among other information, the data management controller 104 may organize the information into categories and generate a user interface 206 displaying a plurality of interactive points 708 corresponding to those categories. According to an exemplary embodiment, user interface 206 displays three interactive points 708, including an Operation button 708, a Troubleshoot button 708, and a Performance Data button 708. Selection of any button 708 by the user 110 causes the data management controller 104 to generate a new user interface with the associated information. For example, selection of the Operation button, causes a user interface to be displayed providing various material relating to the operation of the equipment (e.g., installation video, user manual, instructions for cleaning a system, how to diagram for repairing/replacing components, etc.). Selection of the Troubleshoot button causes a user interface to be displayed providing various material relating to fixing problems associated with the equipment (e.g., list of components to check, diagram for how to take a system apart, list of common issues, etc.). Selection of the Performance Data button causes a user interface to display previous performance data for the equipment, or an option to submit notes or reports regarding the current performance of the equipment. Any information provided via the user interface 206 of the user device 102 may be in any format including, but not limited to, videos, documents, recordings, diagrams, pictures, and lists. The information is provided to the user 110 directly from the memory 122 of the data management controller 104 or the data management system may direct the user 110 to a third-party source via a third-party computing system (e.g., data management controller 104 may provide the user 110 a link to take the user 110 to a third-party website with related equipment information).

Figure 8:
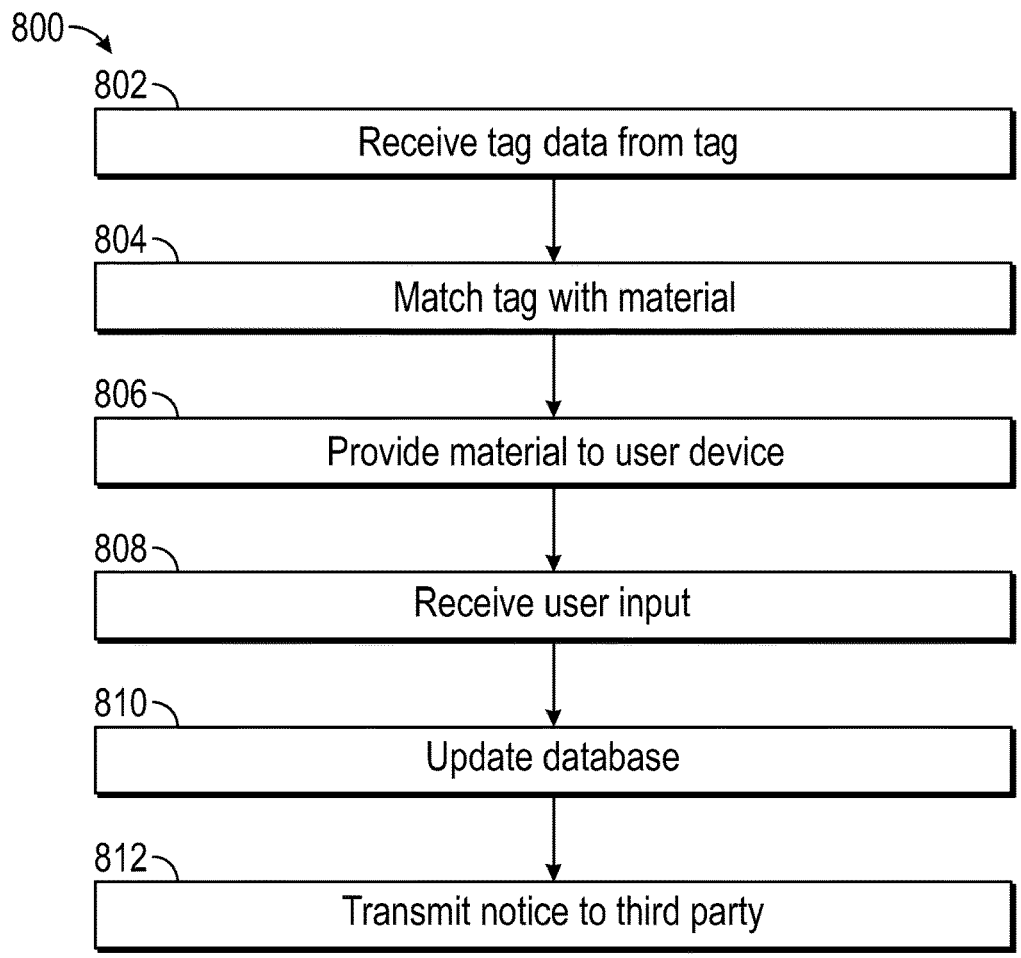
FIG. 8 is a flow diagram of a method of providing an operator and/or manufacturer of equipment material associated with a corresponding tag, according to an exemplary embodiment.

According to an exemplary embodiment, as shown in FIG. 8, method 800 provides operators and/or manufacturers of equipment material associated with a corresponding tag 108. The method 800 may be implemented using the instructional system 100 of FIG. 1. As such, reference will be made to instructional system 100 of FIG. 1 when describing method 800. The method 800 may be implemented using the user device 102, for example, through an application installed on the user device 102. In another embodiment, the method 800 may include additional, fewer, and/or different operations.

According to an exemplary embodiment, at operation 802, the instructional system 100 (e.g., data management controller 104) receives tag data from a tag 108. The identifier of the tag 108 may be in any form, including but not limited to, QR codes, bar codes, RFID tags, and the like. Operation 802 may further include interpreting the tag data. In one embodiment, operation 802 includes the processor 120 of the data management controller 104 receiving the tag data from a tag 108 from the user device 102. For example, if the identifier is in the form of a QR code, the user device 102 can use the camera 202 of the sensor 112 to detect and read the QR code. Alternatively, if the identifier is in the form of an RFID tag, the sensor 112 of user device 102 can be a sensor that can detect electromagnetic fields (e.g., RFID reader device, etc.).

Figure 9:
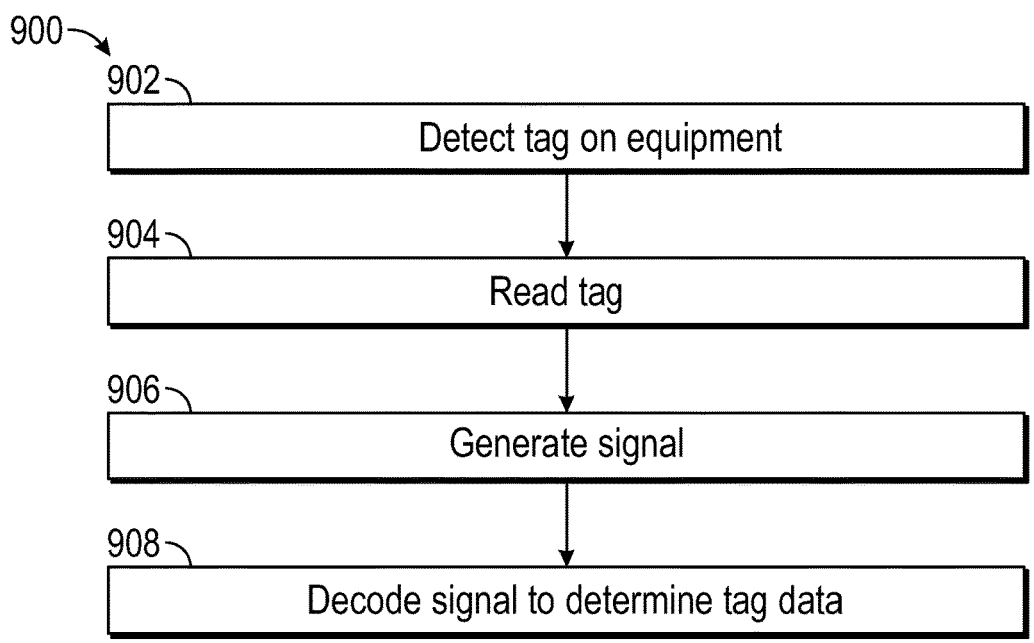
FIG. 9 is a flow diagram of a method of obtaining tag data from a tag, according to an exemplary embodiment.

According to an exemplary embodiment, as shown in FIG. 9, method 900 obtains tag data from a tag. At operation 902, the user device 102 detects a tag 108 on equipment. Operation 902 may include positioning the user device 102 near the tag 108, such that the sensor and illuminator of the user device 102 are facing the identifier 406 (e.g., QR code) of the tag. The user device 102 can be positioned such that the sensor is in alignment with the identifier of the tag. In another embodiment, the user device 102 only needs to be close enough to the tag 108 to sense certain environmental factors (e.g., electromagnetic fields) in order to detect the tag 108. For example, when close enough to a tag 108 with an RFID tag, the sensor 112 of the user device 102 may be a device that senses electromagnetic fields transmitted by the RFID tag.

According to an exemplary embodiment, at operation 904, the user device 102 reads the tag 108 to generate a signal at operation 906. Operation 904, according to one embodiment, includes illuminating the identifier of the tag using the illuminator 204 and activating the sensor 112 to detect the light reflected off the tag using the camera 202. Additionally, operation 904 may include holding the sensor 112 (e.g., camera 202) over the tag for a predefined period of time (e.g., allowing the camera 202 to dwell over the tag) so that an accurate reading of the identifier may be performed. In an example embodiment, the tag 108 includes a QR code and reading the tag 108 may include imaging the QR code.

Operations 906 and 908 of method 900 may be performed by either the user device 102 or the data management controller 104. According to an example embodiment, at operation 906 the user device 102 and/or the data management controller 104 generates an analog signal based on the reading of the tag 108 (e.g., the amount of light reflected off of the identifier or the electromagnetic fields). In some embodiments, operation 906 includes transmitting the analog signal (e.g., via a user device network circuit 114 over network 106) to the data management controller 104. In other embodiments, the tag data obtained from reading the tag 108 is transmitted to the data management controller 104 prior to generating a signal. In that case, the processor 120 of the data management controller 104 generates the signal.

According to an example embodiment, at operation 908, the user device 102 and/or data management controller 104 decodes the signal to determine the tag data. Operation 908 may include converting the analog signal to a digital signal using an analog-to-digital converter. Operation 908 may further include interpreting the digital signal, for example, using a decoder. The decoder may convert the digital signal to alphanumeric characters such as a hyperlink that may be used to direct the user device 102 to the material that is associated with the tag 108. In other embodiments, operation 908 includes interpreting the digital signal to obtain identifying information for the product that the tag 108 is affixed to (e.g., the type of product, etc.). Operation 908 is performed by the user device 102 or by the processor 120 of the data management controller 104 depending on when data is transmitted from the user device 102 to the data management controller 104.

According to an exemplary embodiment, returning to FIG. 8, method 800 includes operation 804, matching the tag 108 with material from the tag database 126. The matching is based on the tag data from operation 908. In one embodiment, operation 804 includes the processor accessing the tag database 126 via the controller circuit 124 to identify the material that is associated with the tag 108. According to an exemplary embodiment, operation 804 includes entering a web address/URL into an internet browser installed on the user device 102. The web address is associated with the material for the tag 108. In other embodiments, the material matching the tag 108 forms a part of an application. The material includes a single format of material (e.g., only videos) or multiple formats of material (e.g., videos, manuals, recordings, diagrams, etc., and combinations thereof) that may be presented to the user 110 to improve operator safety and/or facilitate training regarding equipment operation. In some embodiments, the material also includes links to additional training and/or diagnostic tools (e.g., links to relevant pages of a user/service manual, links to a customer support contact, etc.).

According to an exemplary embodiment, at operation 806, the material is provided to the user device 102. The material is provided to the user device 102 via an internet browser installed on the user device 102 or via an application generated and/or transmitted from the data management controller 104 to the user device 102. Operation 806 may include generating the application and/or transmitting the application from the data management controller 104 to the user device 102 via network 106.

According to an exemplary embodiment, the method 800 also includes continuously monitoring the performance of equipment based on the tag data by storing performance data and providing the performance data to a third party (e.g., supplier, manufacturer, distributor, dealership, etc.). At operation 808, the processor 120 of the data management controller 104 receives user input from the user 110. Operation 808 includes soliciting user feedback through the internet browser (e.g., supplier web portal) or the application on the user device 102. For example, operation 808 may include presenting the user 110 with a questionnaire, which may be part of the material or included as a separate module. In some embodiments, the questionnaire may have questions relating to the step-by-step training operation being demonstrated in the material (e.g., "have you placed a drain pan underneath the test port on the hydraulic valve bank?," "would you like more information regarding this step?," etc.). The questionnaire may ask the user 110 to rate the helpfulness of material, or may request that the user specify the particular reasons for accessing the video. Additionally, the questionnaire may include questions related to the type of equipment (e.g., product model number, serial number, etc.) and/or the performance of the equipment (e.g., what are the symptoms of the problem, etc.).

At operation 810, the data management controller 104 updates the tag database 126 and/or the product performance database 128 based on the tag data and/or the user input. Operation 810 may include updating a counter to record/track a number of times that an operator accesses data associated with a certain type of tag 108 (e.g., increasing the counter by an integer value each time the tag data is received by the data management controller 104 via the processor 120). Additionally, operation 810 may include compiling user inputs (e.g., from the questionnaire, etc.), which may provide information regarding the effectiveness of the tag 108 and/or the material that is associated with the tag 108. In some embodiments, operation 810 also includes using the user inputs to help identify the reason why a particular issue is occurring (e.g., if the issue is associated with user error, or as diagnostic information to help a manufacturer determine the root cause of a recurring problem across multiple vehicles of the same type, etc.). In other embodiments, operation 810 also includes compiling requests from users 110 to update the information stored in the tag database.

According to an exemplary embodiment, operation 812 includes transmitting a notice to a third-party computing system (e.g., a remote server hosted by the manufacturer). Operation 812 include transmitting the product performance indicator, the tag database update request, or other tag data to the supplier of the equipment (e.g., for a vehicle, a dealership, distributor, manufacturer, etc.) or another third-party for further review and analysis. The notice discloses any update made to the databases. In some embodiments, operation 812 includes transmitting the product performance indicator, tag database request, and the other tag data directly from the user device 102 to a third-party computing system. In other embodiments, operation 812 includes transmitting the notice to a customer service representative assigned to the equipment. In some embodiments, method 800 includes making a recommendation or request for parts and/or service based on the indicator. For example, the method 800 may include receiving an indicator that relates to a service and/or maintenance operation (e.g., changing oil of a vehicle). The method 800 may include automatically generating a purchase order and/or service appointment in response to the indicator.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, EPROM, EEPROM, or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the instructional system as shown in the various exemplary embodiments is illustrative only. Additionally, any element disclosed in one embodiment may be incorporated or utilized with any other embodiment disclosed herein. Although only one example of an element from one embodiment that may be incorporated or utilized in another embodiment has been described above, it should be appreciated that other elements of the various embodiments may be incorporated or utilized with any of the other embodiments disclosed herein.

What is claimed is:

1. A vehicle system, comprising:
   a vocational vehicle, comprising:
      a chassis comprising a first subcomponent; and
      a body comprising a second subcomponent supported by the chassis, the body defining a receptacle;
   a tag attached to at least one of the first subcomponent and the second subcomponent, the tag comprising an identifier that encodes tag data;
   a data management controller configured to:
      receive the tag data associated with the tag; and
      provide material from a tag database stored by the data management controller to a user device based on the tag data, the material associated with the at least one of the first subcomponent and the second subcomponent, wherein the material includes a plurality of formats, including at least one of videos, recordings, diagrams, images, manuals, and instructions.

2. The vehicle system of claim 1, wherein the data management controller is further configured to:
   receive user input from the user device; and
   update at least one of the tag database and a product performance database based on the user input.

3. The system of claim 2, wherein the user input includes information regarding at least one of effectiveness of the tag, effectiveness of the material matched with the tag, and a reason why a particular issue is occurring.

4. The vehicle system of claim 3, wherein the data management controller is further configured to match the tag data from the tag with material from the tag database.

5. The vehicle system of claim 4, wherein the tag database is configured to store the material associated with the at least one of the first subcomponent and the second subcomponent and the product performance database is configured to store data relating to the performance of the first subcomponent and the second subcomponent.

6. The vehicle system of claim 5, further comprising a plurality of tags, wherein each of the plurality of tags corresponds to a different subcomponent of the vocational vehicle.

7. The vehicle system of claim 6, wherein each of the plurality of tags includes a unique identifier, wherein each of the plurality of tags corresponds with different material from the tag database.

8. The system of claim 1, wherein the vocational vehicle further comprises a lifting system, the lifting system comprising:
lift arms configured to eject waste from a temporary holding container into the receptacle;
a hydraulic cylinder configured to actuate the lift arms;
a compactor configured to compress the refuse within the receptacle; and
an ejector configured to discharge the refuse from the receptacle.

9. The system of claim 1, wherein the identifier of the tag is a quick response code.

10. The system of claim 1, wherein the identifier of the tag is a radio-frequency identification (RFID) tag and a sensor of the user device is an RFID reader device, wherein the user device is configured to transmit the tag data to the data management controller.

11. The system of claim 1, wherein the material forms a part of an application, wherein providing the material to the user device comprises providing the application to the user device.

12. The system of claim 1, wherein the data management controller is further configured to generate a user interface to be displayed on the user device, the user interface comprising:
a header including an image of the identifier of the tag and a name of at least one of the first subcomponent and the second subcomponent of the vocational vehicle; and
a content area including at least one interactive point and substantive material.

13. The system of claim 1, wherein the data management controller is further configured to solicit feedback by presenting a user with a questionnaire via the user device, wherein the questionnaire is a part of the material or is included as a separate module.

14. The system of claim 13, wherein the questionnaire includes at least one question related to at least one of a step-by-step training operation being demonstrated in the material, a rating of helpfulness of the material, a type of subcomponent of the refuse vehicle being used, and a performance of subcomponent of the refuse vehicle being used.

15. The system of claim 14, wherein the data management controller is further configured to transmit a notice to a third-party computing system, wherein the notice includes updates made to the tag database and a product performance database and the feedback from the questionnaire.

16. The system of claim 15, wherein the notice is transmitted to a customer service representative assigned to at least one of the first subcomponent or the second subcomponent of the refuse vehicle.

17. A method, comprising:
receiving, by a data management controller, tag data from a tag attached to at least one of a first subcomponent and a second subcomponent of a vocational vehicle; and
providing, by the data management controller, material from a tag database stored by the data management controller to a user device based on the tag data, the material associated with the at least one of the first subcomponent and the second subcomponent, the material including a plurality of formats, including at least one of videos, recordings, diagrams, images, manuals, and instructions.

18. The method of claim 17, further comprising:
updating, by the data management controller, at least one of the tag database and a product performance database; and
transmitting, by the data management controller, a notice to a third part including updates made to the at least one of the tag database and the product performance database.

19. A non-transitory computer readable medium having computer-executable instructions embodied therein that, when executed, cause the data management controller to perform operations comprising:
receiving tag data from a tag attached to at least one of a first subcomponent and a second subcomponent of a vocational vehicle; and
providing material from a tag database stored by the data management controller to a user device based on the tag data, the material associated with the at least one of the first subcomponent and the second subcomponent, wherein the material includes a plurality of formats, including at least one of videos, recordings, diagrams, images, manuals, and instructions.

* * * * *